(12) United States Patent
Xu

(10) Patent No.: US 6,633,720 B1
(45) Date of Patent: Oct. 14, 2003

(54) HERMETIC SEAL FEED-THROUGH ASSEMBLY FOR OPTICAL FIBER

(75) Inventor: Yaojun Xu, Union City, CA (US)

(73) Assignee: Avanex Corporation, Fremont, CA (US)

( * ) Notice: Subject to any disclaimer, the term of this patent is extended or adjusted under 35 U.S.C. 154(b) by 161 days.

(21) Appl. No.: 09/822,915

(22) Filed: Mar. 30, 2001

(51) Int. Cl.[7] .................................................. G02B 6/00
(52) U.S. Cl. ...................................... 385/138; 439/447
(58) Field of Search .............................. 385/138, 88–94, 385/78, 80; 439/447

(56) References Cited

U.S. PATENT DOCUMENTS

| | | | |
|---|---|---|---|
| 4,296,996 A | 10/1981 | Niiro et al. | |
| 4,593,970 A | 6/1986 | Rhodes | |
| 4,607,911 A | 8/1986 | Rhodes | |
| 5,444,810 A | * 8/1995 | Szegda | ........................ 385/139 |
| 6,220,766 B1 | * 4/2001 | Yeandle et al. | ................ 385/94 |
| 6,321,021 B1 | * 11/2001 | Cairns et al. | ................ 385/138 |

* cited by examiner

*Primary Examiner*—Khiem Nguyen
(74) *Attorney, Agent, or Firm*—Sawyer Law Group LLP

(57) ABSTRACT

The invention provides an optical package assembly that is sealed hermitically with one or more feed-throughs with a mating ferrule. The ferrule has a head and a body, where the head in constructed in a cone shape and the body is constructed in a cylindrical shape. The ferrule is compressed at the head to hermetically sealed the fiber to the optical package and is compressed at the body to hold the fiber in place. It is apparent to one of ordinary skill in the art that the expression of compressing the ferrule can also be described as mechanically deformed the ferrule, or by other similar or equivalent terms.

12 Claims, 5 Drawing Sheets

HERMETIC SEAL FEED-THROUGH ASSEMBLY FOR OPTICAL FIBER

BACKGROUND INFORMATION

1. Field of the Invention

The present invention relates to the field of packaging technology for fiber optics communication devices, and particularly for optical fiber feed-through the package body that provides hermetic sealing of optical devices.

2. Description of Related Art

Fiber optics transmission is now a common platform for transporting voice, data, and images. As the demand for data carrying capacity continues to increase, optical companies are finding techniques to utilize the bandwidth of existing fiber-optic cable more efficiently and increasing the performance of optical devices. The performance of optical devices is sensitive to its operational environment, such as humidity and pressure. Optical devices typically require a tight sealing package, i.e. hermetic sealing package, to prevent moisture or any other gas passing through, thereby ensuring stable performance of the optical devices during their life span. Fiber optics devices also require a package to have a mechanism in place to prevent optical fibers from mechanical damages arising from, for example, pulling or bending. Another desirable feature is to make an optical fiber feed-through removable because it is often necessary to re-open an optical device for rework or modification, particularly between the integration process step and the final test step.

A conventional sealing optical fiber solution uses an epoxy-type material to fill the pore in optical fiber holes and baking the package at an elevated temperature until the epoxy dries. However, this conventional solution is inadequate in meeting hermetic sealing requirements, particularly for an optical fiber with protective plastic coating. The gap between a plastic coating and a glass core also frequently fails to prevent moisture to pass through. To overcome this problem, an optical fiber may be coated with a metal film and then seal the package with epoxy. Still, this approach is difficult to implement for a large scale assembly operation. Accordingly, it is desirable to have a hermetic seal feed-through assembly that addresses these needs.

SUMMARY OF THE INVENTION

The invention provides an optical package assembly that is sealed hermetically with one or more feed-throughs with a mating ferrule. The ferrule has a head and a body, where the head in constructed in a conical shape and the body is constructed in a cylindrical shape. The ferrule is compressed at the head to hermetically sealed the fiber to the optical package and is compressed at the body to hold the fiber in place. It is apparent to one of ordinary skill in the art that the expression of compressing the ferrule can also be described as mechanically deformed the ferrule, or by other similar or equivalent terms.

Advantageously, the present invention provides a strong resistance to external force, compact in package height, simple to install, simple to remove, and applicable to fibers with plastic coating.

DETAILED DESCRIPTION OF PREFERRED EMBODIMENT(S)

Figure 1:
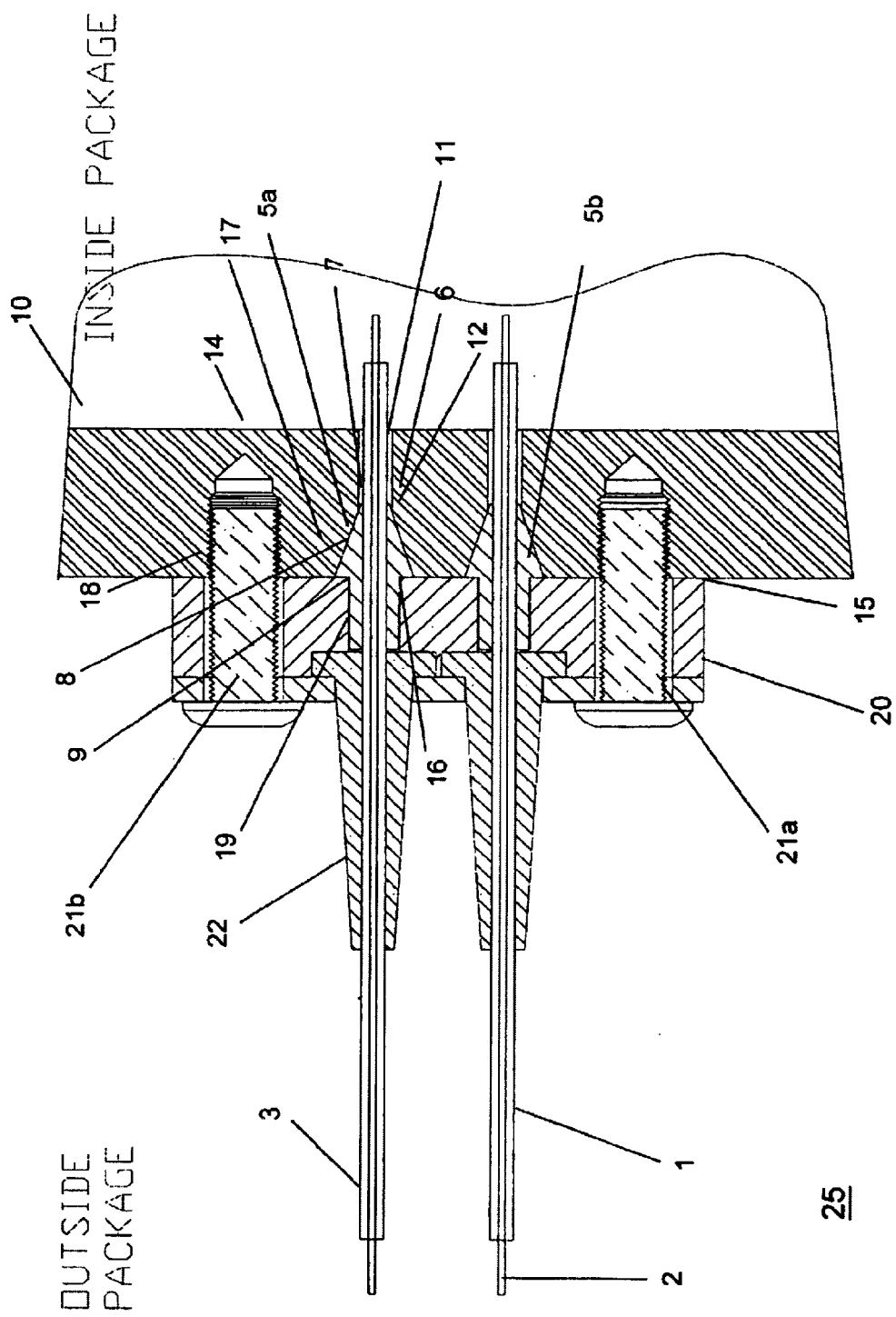
FIG. 1 is a pictorial diagram illustrating a cross sectional view of a hermetic seal feed-through assembly with a two-fibers feed-through in accordance with the present invention.

FIG. 1 is a cross sectional view of a hermetic seal feed-through assembly 25 with a two-fiber feed-throughs. For illustration purposes, one fiber feed-through is described in details. A second fiber feed-through is replicated in FIG. 1, although it is apparent to one of ordinary skill in the art that additional fiber feed-through can be replicated without departing from the spirits in the present invention. The hermetic seal feed-through assembly 25 includes an optical device packaging box body 10, an optical fiber 1, a conical ferrule 5, a ferrule holder 15, a strain relief element 19, a strain relief element holder 20, and holding screw 21. The holding screws 21 applies a compression force onto the strain relief element holder 20 as the holding screws 21 are turned into the threaded holes in the packaging box body 10. The strain relief element holder 20 passes the compression force to the ferrule holder 15 that in turn passes the compression force onto a ferrule surface 8. The reaction force being generated on the package tapered holes surface 12 applies compression force onto the conical head of the ferrules and make the tips of the ferrules plastically deform in a radial direction. As a result, the ferrule outside surface 6 near the tip tightly mates with the tapered holes surface 12 while the ferrule inside surface squeezes the plastic coating 3 hard to eliminates the gap between the plastic coating 3 and the glass core 2 to form a hermetic seal. To make the seal reliable, the cylindrical portion 9 of the ferrule, which is crimped to deform and tightly holding the fiber 1 before the ferrules 5 are inserted into the package tapered holes, is used to avoid the external pulling force directly exerted onto the sealing surface. The strain reliefs 19 and their holder 20 relieve the bending moment on the fibers and add further mechanical protection for reliable package. To make the assembly work properly, the screws 21 should by tightened evenly, i.e., take turn to tighten each screw so that the ferrule holder 15 moving evenly toward to package body 10. One of ordinary skill in the art should recognize that this concept is applicable to more than two-fiber feed-throughs.

Figure 2:
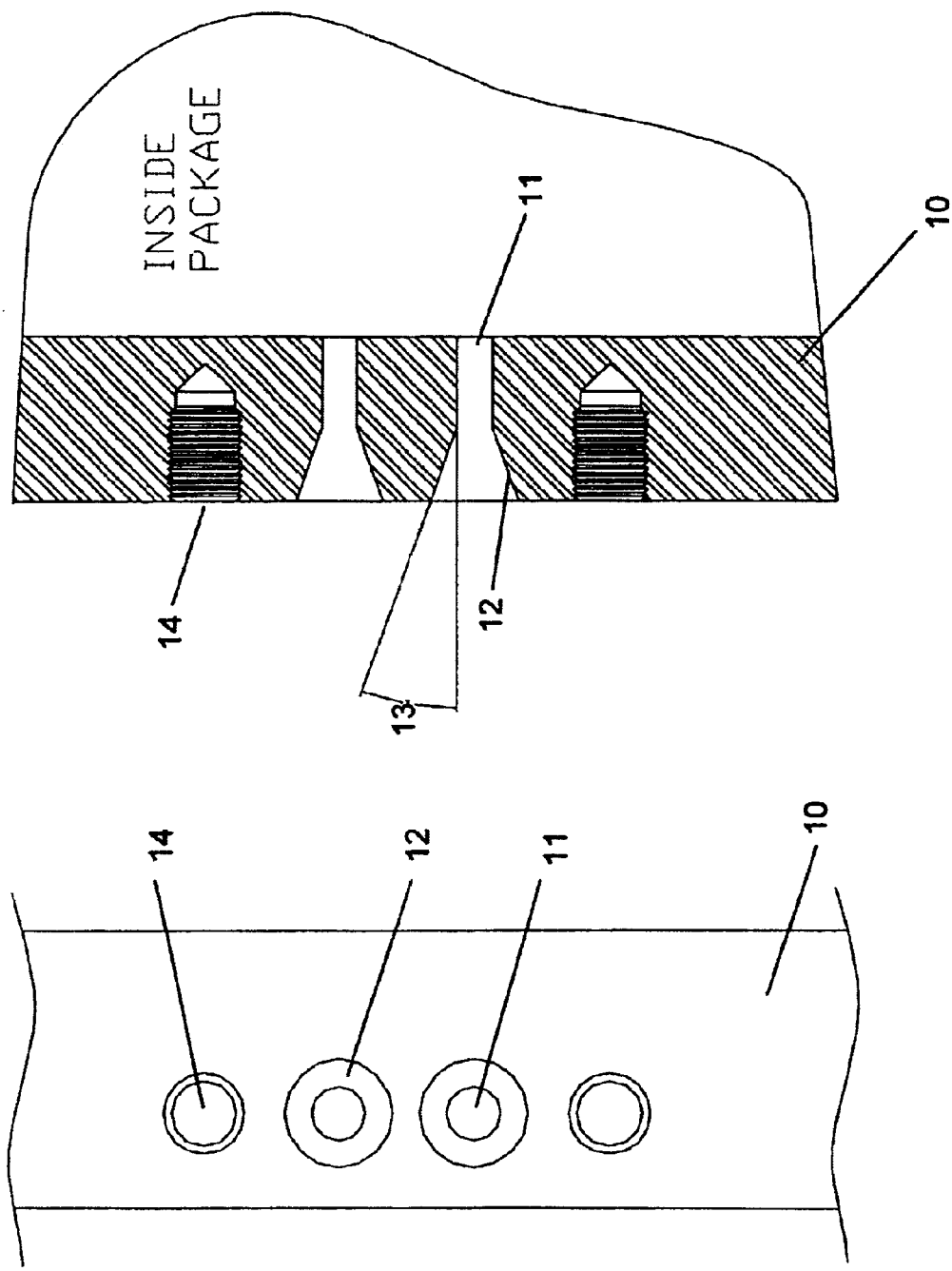
FIG. 2 is a pictorial diagram illustrating a cross sectional view of the feed-through portion in the package box in accordance with the present invention.

FIG. 2 is the cross sectional view of the package box feed-through portion 10. Preferably, an angle 13 for the package tapered holes ranges from 10 to 25 degree. The optical fiber feed-through area has holes 11 slightly larger than fiber plastic coating 3 outside diameter and the tapered portion 12 that has the angle 13 slightly larger than the ferrule tapered angle 4. The threaded blind holes 14 are for mounting screws 21.

Figure 3:
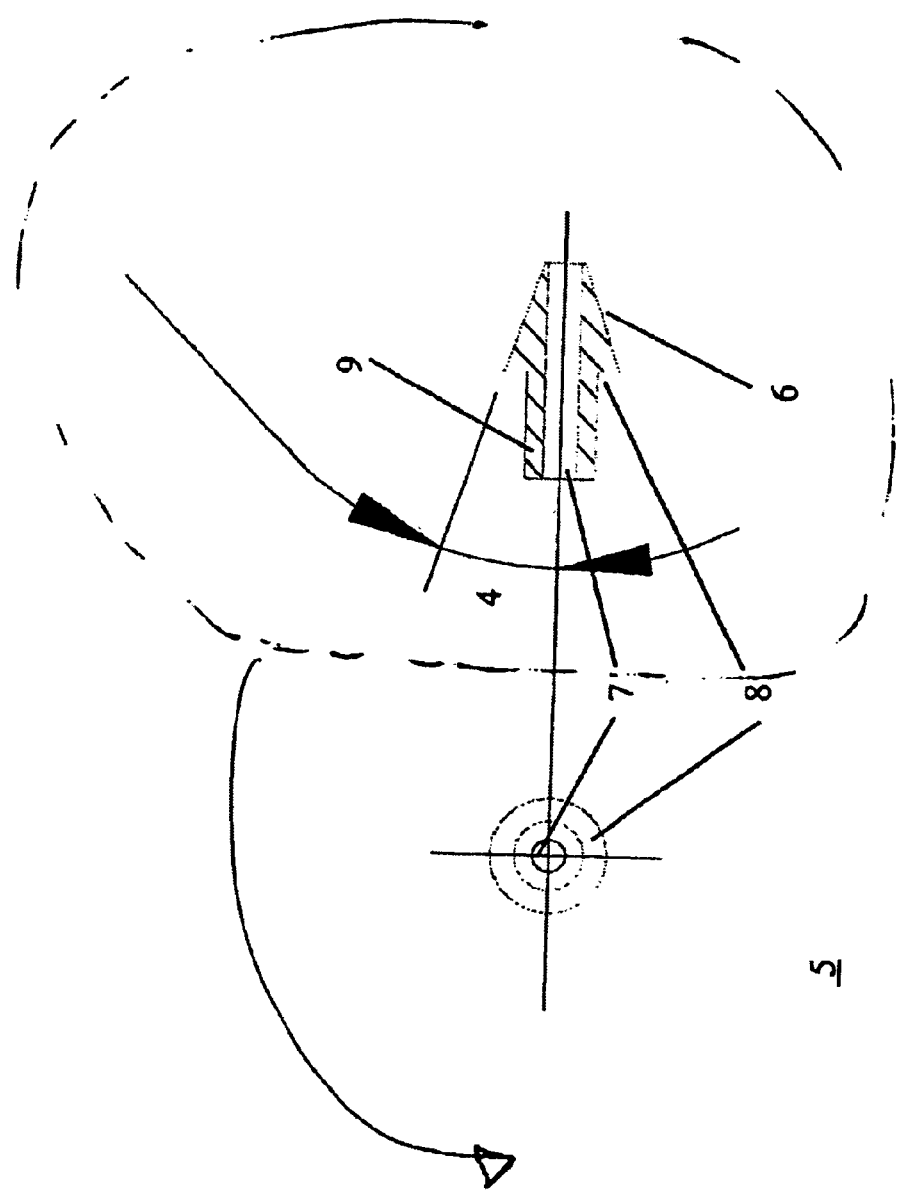
FIG. 3 is a pictorial diagram illustrating the ferrule used in the hermetic seal feed-through assembly in accordance with the present invention.

FIG. 3 is a pictorial diagram illustrating the ferrule 5 used in the hermetic seal feed-through assembly. In one embodiment, the ferrule 5 is made of materials harder than the plastic coating 3 of the optical fiber but softer than the materials of the package body 10. The ferrule 5 has a conical surface 6 for mating to the tapered hole 12 in the package box body 10, a cylindrical inner surface 7 mating to the optical fiber, and a cylindrical outer surface 9 in its rear portion for crimping the fiber 1. The length of the conical portion 6 on the ferrule 5 is slightly longer than the length of the package body mating surface 12. With the combination of the slight difference between the tapered angles and lengths on the tapered surfaces on the package body 10 and the ferrules 5, the conical surface 6 near the tip of the ferrule is compressed first and subjected to highest compression stress upon installed. The preferred angle 4 for the ferrule is about 2 degree smaller than the package body mating surface angle 13. The preferred length of ferrule conical surface 6 is about 10 to 20 percent longer than the package body tapered surface 12. An electrician wire crimp tool is used to crimp the rear cylindrical portion 9 into approximately diamond-shape cross section with its diagonal not larger than the original cylindrical diameter before the ferrules 5 are compressed by the ferrule holder 15 onto the package body 10.

Figure 4:
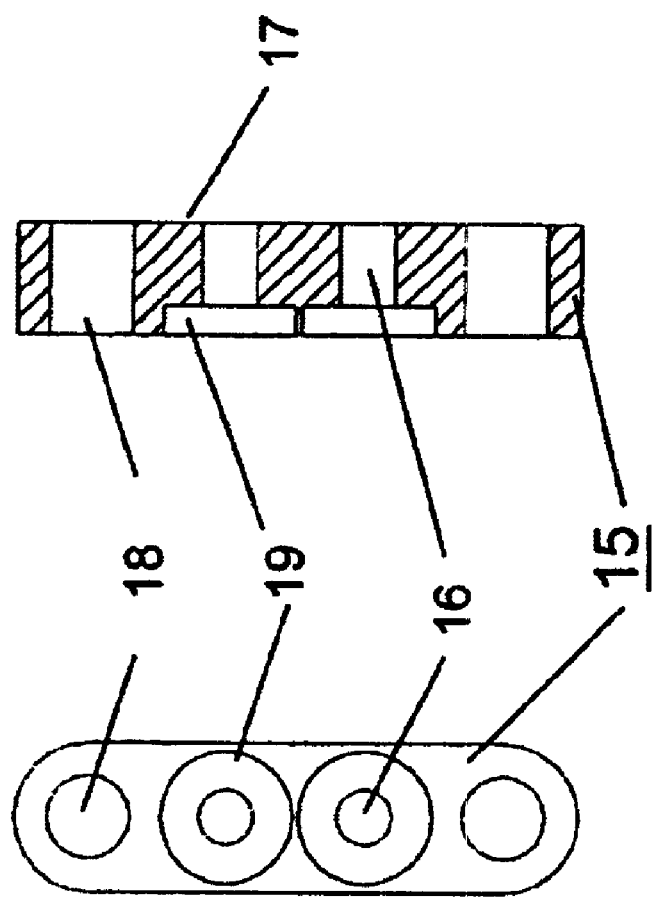
FIG. 4 is a pictorial diagram of a ferrule holder used in the hermetic seal feed-through assembly in accordance with the present invention.

FIG. 4 is a pictorial diagram of a ferrule holder 15 used in the hermetic seal feed-through assembly. The surface 17 has a direct contact with the ring shape surface 8 of the ferrules to exert compression force onto the ferrules 5. The ferrule holder 15 made of materials harder than the ferrules 5. The ferrule holder surface 17 is pushed against the ferrule surface 8 to produce compression stress on the conical surface 6. The holes 16 are about ten percent larger than the outside diameter of the ferrule section 9 to ensure not interfering with the deformed body of the ferrules. The counter-bored portions 19 of the ferrule holder provide room for the strain relief elements 22. The through holes 18 on the ends are for the mounting screws 21 passing through.

Figure 5:
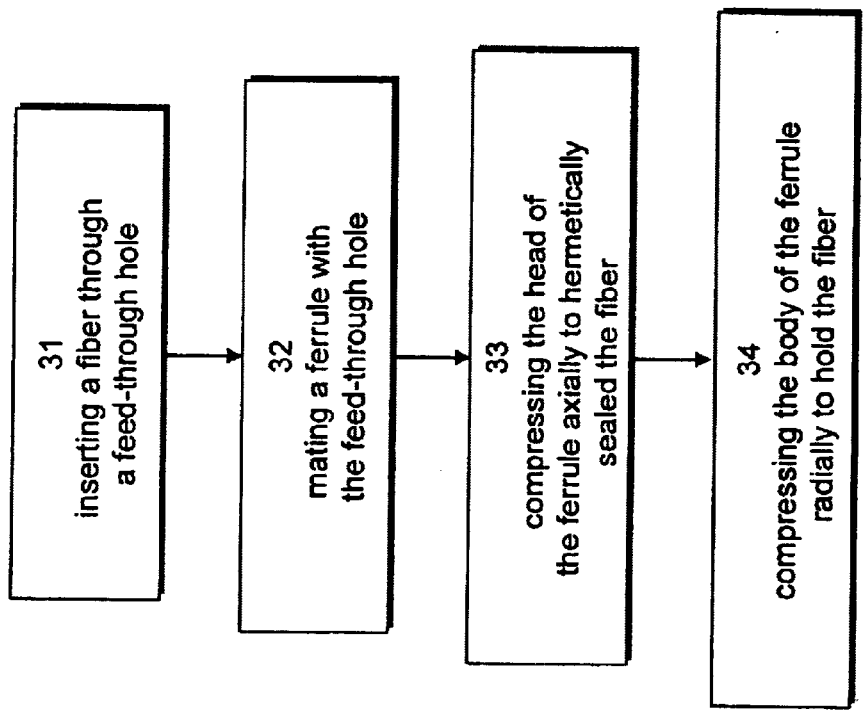
FIG. 5 is a flow chart illustrating the process in hermetically seal a feed-through assembly with one or more ferrules in accordance with the present invention.

FIG. 5 is a flow chart illustrating the process 30 in hermetically seal a feed-through assembly with one or more ferrules. At a step 31, the fiber 3 is inserted through a feed-through hole in the package body 10. At a step 32, the ferrule 5, the ferrule holder 15, the strain relief element 19, and the strain relief element holder 20 are inserted along the fibers with the conical head of the ferrule mated toward the feed-through hole of the package body. At a step 33, the body of the ferrule 5 is compressed radially with an electrician wire crimp tool to hold the ferrule on the fiber 3. At a step 34, the conical head of the ferrule 5 is compressed to hermetically sealed the fiber 3.

The above embodiments are only illustrative of the principles of this invention and are not intended to limit the invention to the particular embodiments described. For example, the ferrule may be constructed with plastic or other suitable material. Moreover, the shape of the ferrule can be designed in variety of shapes such as double conical shape on both ends with its holder modified accordingly. The number of optical fibers passing the feed-through can be greater or less than two as long as the design increasing the corresponding elements. The conical sealing surface may also have variations such as spherical shape instead of conical shape. The ring shape surface 8 of the ferrules may change, along with the holder surface 17, from perpendicular to the ferrule axial to a conical shape. The cylindrical portion for crimping may have a number of variations to accomplish the same purpose. One of ordinary skill in the art should recognize that the term conical shape in a ferrule can be described in other similar or equivalent terms, such as tapered shape. Accordingly, various modifications, adaptations, and combinations of various features of the described embodiments can be practiced without departing from the scope of the invention as set forth in the appended claims.

I claim:

1. A removable hermetic seal feed-through assembly, comprising:
   an optical package having a first fiber feed-through hole;
   a first fiber for inserting through the first fiber feed-through hole; and
   a first ferrule having a head attached a body, the head having a conical shape for mating with the first fiber feed-through hole, the body having a cylindrical shape;
   wherein during a hermetical seal of the optical package, the head of the ferrule being compressed axially to hermetically sealed the fiber, the body of the ferrule being compressed radially to hold the fiber.

2. The removable hermetic seal feed-through assembly of claim 1, further comprising a non-rotational metal holder, mounting on the outside of the optical package, to provide compression force to the ferrule against the packaging body to achieve the desired compression sealing effect.

3. The removable hermetic seal feed-through assembly of claim 1, wherein the ferrule is made to mechanically deform to hold the fiber in place so that the feed-through seal can resist higher pulling load without failure.

4. The removable hermetic seal feed-through assembly of claim 1, further comprising one or m ore rubber boots, coupled to the fiber, to provide additional mechanical protection.

5. The removable hermetic seal feed-through assembly of claim 1, wherein the ferrule with a tapered outer surface and cylindrical inner surface, which having an inner diameter approximately equal to or slightly larger than the outer diameter of the optical fibers.

6. The removable hermetic seal feed-through assembly according to claim 1, wherein the at least one fiber feed-through hole in the optical package body is made in a tapered shape with its tapered surface angle slightly larger than the angle of the ferrule outer surface.

7. The removable hermetic seal feed-through assembly according to claim 2, wherein the metal holder is relatively rigid subjecting to bending moment and which pushes the ferrule against the optical package.

8. The removable hermetic seal feed-through assembly according to claim 4, wherein the rubber boot attached to the holder for relieving bending damage.

9. The removable hermetic seal feed-through assembly according to claim 1, wherein the ferrule comprises metal.

10. The removable hermetic seal feed-through assembly according to claim 1, wherein the ferrule comprises plastic.

11. The removable hermetic seal feed-through assembly of claim 1, further comprising:
    a second fiber feed-through hole;
    a second fiber for inserting through the second fiber feed-through hole; and
    a second ferrule having a head attached a body, the head having a cone shape for mating with the second fiber feed-through hole, the body having a cylindrical shape.

12. The removable hermetic seal feed-through assembly of claim 11, wherein the head of the second ferrule is compressed axially to hermetically sealed the second fiber, and wherein the body of the second ferrule is compressed radially to hold the second fiber.

* * * * *